(12) United States Patent
Feng et al.

(10) Patent No.: US 8,645,460 B2
(45) Date of Patent: Feb. 4, 2014

(54) METHOD FOR MANAGING OBJECT-BASED STORAGE SYSTEM

(75) Inventors: Dan Feng, Hubei (CN); Liping Pang, Hubei (CN); Yulai Xie, Hubei (CN); Fang Wang, Hubei (CN); Zhongying Niu, Hubei (CN); Ke Zhou, Hubei (CN); Juan Wang, Hubei (CN); Yinliang Yue, Hubei (CN); Xudong Tu, Hubei (CN); Shuibing He, Hubei (CN); Chengtao Lu, Hubei (CN)

(73) Assignee: Huazhong University of Science and Technology, Hongshan District, Wuhan, Hubei (CN)

( * ) Notice: Subject to any disclaimer, the term of this patent is extended or adjusted under 35 U.S.C. 154(b) by 336 days.

(21) Appl. No.: 13/063,934

(22) PCT Filed: Oct. 7, 2008

(86) PCT No.: PCT/CN2008/072606
§ 371 (c)(1),
(2), (4) Date: Mar. 14, 2011

(87) PCT Pub. No.: WO2010/040255
PCT Pub. Date: Apr. 15, 2010

(65) Prior Publication Data
US 2011/0167113 A1    Jul. 7, 2011

(51) Int. Cl.
*G06F 15/16* (2006.01)

(52) U.S. Cl.
USPC ............................................. 709/203

(58) Field of Classification Search
USPC ............................................. 709/203
See application file for complete search history.

(56) References Cited

U.S. PATENT DOCUMENTS 7,730,213 B2 *    6/2010  Howard ................ 709/248
2007/0288247 A1 * 12/2007 Mackay ................... 705/1

* cited by examiner

*Primary Examiner* — Kevin Bates
*Assistant Examiner* — Ronak Patel
(74) *Attorney, Agent, or Firm* — Helen S. Liu (57) ABSTRACT

A method for managing an object-based storage system is provided. The object-based storage system includes root objects, partition objects, collection objects, user objects and function objects. The function objects include user function objects and system function objects. The user function objects respond to the client request, so that the existing data-processing tasks requested by the client are moved to the OBSD to be completed, so as to achieve the purposes for saving the network storage bandwidth and improving the security of the stored data, etc. The system function objects execute the system management function, so that the management of the bottom of disks management of the file system and database system is completed by the OBSD. That can be easily realized in automatic data backup, load balancing and other functions in the storage system. The user function objects and system function objects can be customized by the user.

3 Claims, 5 Drawing Sheets

METHOD FOR MANAGING OBJECT-BASED STORAGE SYSTEM

FIELD OF THE INVENTION

This application is a National Phase Application of International Application No. PCT/CN2008/072606, filed on Oct. 7, 2008. This application claims priority to and the benefit of the above PCT application, the disclosure of which is incorporated by reference in its entirety.

The present invention relates to the technical field of computer information storage, in particular relates to the access and management of the object-based storage devices.

BACKGROUND OF THE INVENTION

With the development of electronic technology, increasing processing power has been embedded into the storage devices. In this case, the partial functions of upper-layer applications can be transferred to the devices. The currently pandemic storage devices are "dumb" devices, which can just passively make response to the client requests. The conventional management method for storage devices can hardly adapt to the growing complexity of the device functions. It is urgent to develop a new management method that is more simple, flexible and device-involved to meet with requirement for management. In addition, since there is no obvious improvement in the essential characteristic of the mechanical movement of hard disk, and the network delay can not be ignored under network storage conditions, especially when network share has spanned the wide-area network environment, it is critical to increase the data transfer speed between the process nodes and the storage nodes in order to improve the overall system performance. The current object-based storage interface merely supports simple object read/write operation. In many circumstances such as database queries, the users need to read all the data from storage devices through network to local nodes for processing, but in the end merely use a small amount of the processed data, leading to a serious waste of network bandwidth. According to the principle of processing data nearby, it is necessary to add intelligent processing capacity to the storage devices, so as to first filter the data through operation before transmission. T10 OBSD (Object-Based Storage Device Commands) standard defines the root object, the partition object, the collection object and the user object. However, it is impossible to support the intelligent processing in the storage devices only by using these objects. The current research on the intelligence of storage system has put forward the theoretical conception that the calculation functions which need to be completed by the client-side in current technical architecture should be transferred to the storage devices. However, there is a lack of operable object-based storage access interface, which can support the transfer of functions to the storage devices as well as the execution schedule of such transferred functions.

SUMMARY

In view of the deficiency of the prior art, the present invention provides a management method for an object-based storage system, which can support intelligent processing in the storage devices, and provides effective object-based storage access interface to support the download and the flexible execution of functions.

In order to solve said technical problem, the present invention provides a management method for an object-based storage system. Said object-based storage system comprises a client, an Object-Based Storage Device (OBSD), a metadata server and an interconnect network, wherein the interconnect network connects the client, the OBSD, and the metadata server. The OBSD comprises a root object, a partition object, a collection object, a user object, and a function object. The function object comprises a user function object and a system function object. When the OBSD responses to a client's requests for the user object, the OBSD calls the user function object to execute the client request. The system function object reads in real-time the root object attributes, as well as the real time system status information of the OBSD, and determining whether the object-based storage system is in a specific condition according to the acquired status information. If the object-based storage system is in the specific condition, the system function object performing a predetermined specific system management functions.

In a preferred embodiment, in above said the management method, the system function object is located in a zero partition object, and the user function object is located in the partition object other than the zero partition object.

Also in a preferred embodiment, the function object can only be contained in one partition object, and said partition object can contain zero or a plurality of said function objects.

In a preferred embodiment, said user function object is associated with zero or a plurality of user objects. This association comprises setting a function object ID (identifier) field in the user object information attribute. This function object ID (identifier) field stores a storage function object ID, and this function object ID indentifies a specific function object.

Furthermore, the execution of a Read/Write command for object-based storage system comprises following steps:

5-1. Setting the value of a function object flag in the command description block (CDB) of READ/WRITE USER OBJECT command. The value of this function object flag should be "0" or "1".

5-2. The client sending the READ/WRITE command to OBSD.

5-3. OBSD reading the function object flag in this CDB, and determining its value. If the flag is "0," no function objects will be called. If the flag is "1," the OBSD will read the function object ID from user object information attribute identified by the user object ID in the CDB, and then call the function object identified by the function object ID to execute.

Furthermore, the execution of a CREATE USER/SYSTEM FUNCTION OBJECT command for object-based storage system comprises following steps:

6-1. Setting the function object length field and the requested function object ID field in the CREATE USER/SYSTEM FUNCTION OBJECT command's CDB. And said function object length field defines the byte length of the function object content to be downloaded.

6-2. The client sends CREATE USER/SYSTEM FUNCTION OBJECT command to the OBSD, and simultaneously uploads the content of the user/system function object. The content of the user/system function object to be created is encapsulated in the command data or parameter data segment in the data output buffer area;

6-3. OBSD reads the CDB sent from the client. If the field value of the requested function object ID in this CDB is "0," OBSD will randomly assign a function object ID to the downloaded function object. If the field value of the requested function object ID in this CDB is not "0," OBSD attempts to assign the function object ID to the user/system function object to be created, upon meeting the following function object ID assignment conditions. In a partition, the following circumstances are not permitted: a) at a moment, a function object ID identifies a plurality of function objects; or b) the function object ID is the same as an existing collection object ID or user object ID. If the field value of the requested function object ID is not "0," and the OBSD is unable to assign the requested function object ID to the function object to be created, this function object will not be created, and an error information should be returned to the client.

In one embodiment, the execution of a LIST FUNCTION command for object-based storage system comprises following steps:

7-1. Setting the partition object ID field and the function object ID field in the LIST FUNCTION command's CDB.

7-2. The client sends LIST FUNCTION command to OBSD;

7-3. The OBSD reads the LIST FUNCTION command's CDB. If the field value of function object ID in the LIST FUNCTION command's CDB is "0," all the function object IDs in the partition object identified by the partition object ID in this CDB will be returned. If the value of the function object ID in the LIST FUNCTION command's CDB is not "0," the user object ID associated with the function object ID which is in the partition identified by the partition object ID in the LIST FUNCTION command's CDB will be returned. If the function object identified by this function object ID does not exist, this command will be terminated with an abnormal status.

In one embodiment, the execution of a REMOVE USER/SYSTEM FUNCTION OBJECT command for object-based storage system comprises following steps:

8-1. Setting a Force Remove Function Object flag, a function object ID field and a partition object ID field in the REMOVE USER/SYSTEM FUNCTION OBJECT command's CDB. The content of function object ID specifies the function object to be deleted, and the content of partition object ID specifies the partition object to which the function object to be deleted belongs.

8-2. The client sends REMOVE USER/SYSTEM FUNCTION OBJECT command to OBSD.

8-3. The OBSD reads the CDB. If the value of partition object ID is "0," then the function object identified by this function object ID in the partition identified by the partition object ID will be deletes.

8-4. If the field value of partition object ID is not "0," the function object is associated with some user object, and the Force Remove Function Object flag is "0," this command will be terminated with an abnormal status.

8-5. If the field value of partition object ID is not "0," the function object is associated with some user object, and the value of Force Remove Function Object flag is "1," then the function object ID attribute value is set as "0" in the user object information attribute identified by the user object IDs that are associated with the function object identified by the function object ID, so as to indicate that these user objects are no longer associated with this function object. Then the function object identified by this function object ID in the partition that is identified by the partition object ID will be deleted.

8-6. If the value of partition object ID is not "0," and this function object is not associated with any user object, then the function object identified by the function object ID in the partition that is identified by the partition object ID will be deleted.

In another embodiment, the system function object comprises a plurality of system function objects namely a first system function object, a second system function object, . . . , and an nth system function object; wherein the first system function object reads in real-time the root object's attribute and the system real-time status information of the OBSD, and determines whether the system is in a certain condition; wherein if the system is in the certain condition, it will call the other system function objects to perform a specific system management functions.

The present invention provides a management method for object-based storage system. It extends the OSD object in OBSD on the basis of T10 OSD standard, defines the system function object and user function object, and extends the access command set of the object-based storage devices. It supports the intelligent processing in the storage device and also provides effective object access interface to support the transfer of functions to the storage devices as well as the flexible execution schedule of such transferred functions. In the present invention, the user function object is designed to make response to the client request and perform the operation of client request, so that the data processing tasks undertaken by the existing client are transferred to the object storage devices for completion, and thus achieve the purposes of saving the network storage bandwidth and improving the security of storage system. The system function object is responsible for performing system management functions, so that the management of underlying disk storage systems, such as file system and database system, can be completed by object-based storage device, and automatic data backup, load balancing and other functions can be easily realized in the storage system. Both the user function object and the system function object can be customized by the user. The present invention changes the data management and processing modes of the traditional storage systems, improving the performance of storage system.

DETAILED DESCRIPTION

The present invention is based on, but not limited to, T10 OSD standard. The T10 OSD standard has defined the root object, the partition object, the collection object and the user object, but does not discuss how to manipulate these objects. In present invention, the function object, which is identified by the function object ID, could be apart of executable code programmed using C, C++, or JAVA language. The function object includes the user function object and the system function object.

When a WRITE/READ command sent by the client to the device contains the function object flag parameter, the system will call the corresponding user function object to execute the command. In the reading process, the system will call the user function object, which processes the data and then returns the processed data to the client. For example, the file directory query operation is sent to the device-side, so that the data can be processed nearby. This method is designed to avoid significant network delay, and make full use of the processing capability of the devices. And in the writing process, the execution of user function object could preserve data better.

For example, data compression or encrypting the data on the disk can ensure that the data will not be known by the others even if the disk is lost.

The system function object can be used for storage management. After execution, the system function object can perform self-management functions of OSD, such as automatic data backup, automatic load balancing and excavating rules from the object attributes and so on.

Figure 1:
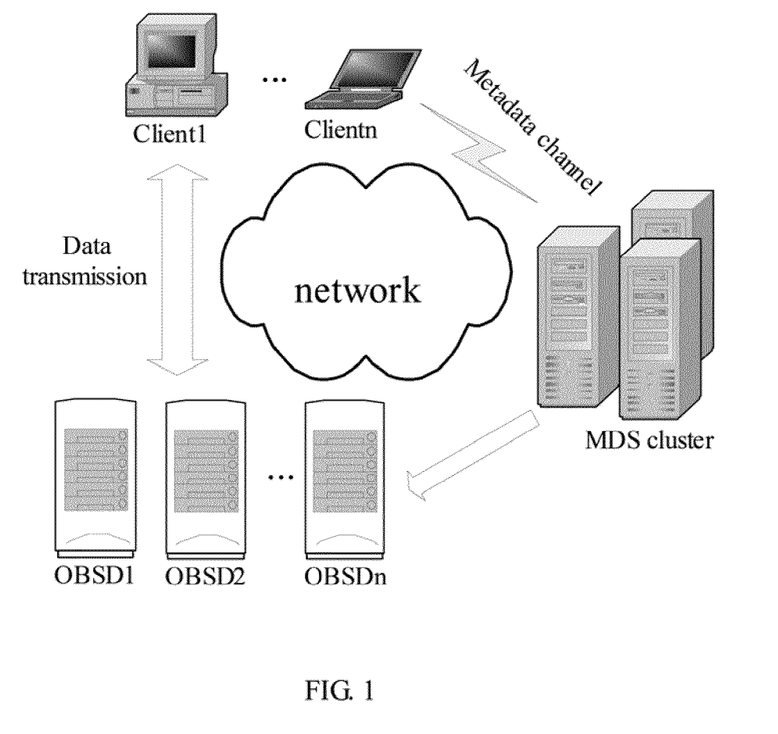
FIG. 1 illustrates the architecture of the object-based storage system.

FIG. 1 illustrates the architecture of the object-based storage system. It contains a series of application clients, Client 1 . . . Client n; a series of storage node devices, OBSD1, OBSD2 . . . OBSDn; a Metadata Server (MDS) Cluster; and a high-speed interconnection network connecting the clients, the storage node devices and the metadata server cluster. There is a metadata channel connection between the application clients and the MDS cluster. The MSD Cluster can be virtually realized as a software module running on the client or storage device. Usually, the client first sends an object operation request command to the metadata server, and the metadata server handles this command as following: (1) mapping the File ID to the Object ID; (2) requesting the Device ID where the file is located; (3) assigning the requested operation command with authority certificate. Upon the metadata server feeds back this information to the client, the client could directly access the OBSD to initiate reading process or writing process by using the acquired Object ID. If the corresponding function object is required to be executed during the access, the function object flag will be contained in the access parameters.

Figure 2:
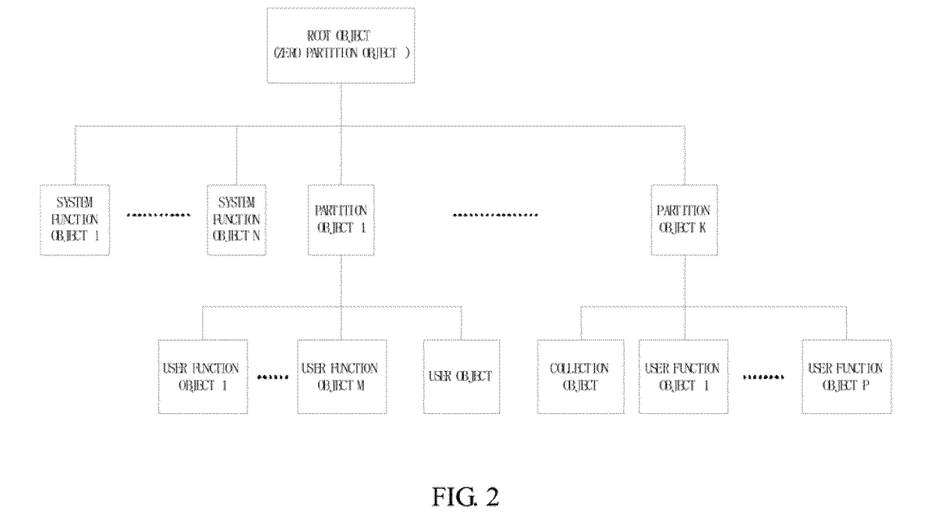
FIG. 2 illustrates the distribution of objects in the object-based storage device.

FIG. 2 illustrates the distribution of objects in the object-based storage device. The symbols n, k, m, and p, as shown in FIG. 2, are non-negative integers. Each OSD (Object-Based Storage Device Commands) logical unit in the object storage device has a root object. The root object is the starting point for navigation of the structure on an OSD logical unit. The zero partition object represents the root object. The root object's attribute contains global characteristics for the OSD logical unit (e.g., the total capacity of the logical unit and number of partitions that it contains). The root object contains all the partition object identifiers for the partitions as well as all the system function object identifiers for the system function object in the logical unit. Said system function object contains a first system function object, a second system function object . . . , and an nth system function object. The first system function object reads in real-time the root object's attribute and the system real-time status information of the object storage device; and determines the system status according to the acquired status information. If the system is in a certain status, it will program other system function objects (the second . . . the nth system function objects) to perform the system management functions.

The user function object locates in a non-zero partition object which can be associated with zero or a plurality of user objects. The user function objects under non-zero partition object can be associated/unassociated with a user object by setting the function object ID attribute values (Function_Object_ID) in the user object information attribute (see Table 1). The attribute value in the function object ID attribute associated with the user object identified by the user object ID is 3h and occupies 8 bytes, as shown in Table 1.

TABLE 1

The user object information attributes page

| Attribute Number | Length (byte)[a] | Attribute | Is the application client is settable | Is it provided by OSD Logical Unit |
|---|---|---|---|---|
| 0h | 40 | Page identification | No | Yes |
| 1h | 8 | Partition Object_ID | No | Yes |
| 2h | 8 | User_Object_ID | No | Yes |
| 3h | 8 | Function_Object_ID | Yes | Yes |
| 4h to 8h | | Reserved | | |
| 9h | variable | Username | Yes | No |
| Ah to 80h | | Reserved | No | |
| 81h | 8 | Used capacity | No | Yes |
| 82h | 8 | User object logical length | Yes | Yes |
| 83h | 4 | Object accessibility | Yes | No |
| 84h to D0h | | Reserved | No | |
| D1h | 0 or 8 | Actual data space | No | Yes |
| D2h | 0 or 8 | Reserved data space | Yes | No |
| D3h to FFFF FFFEh | | Reserved | No | |

[a]A length of 0 in this column denotes an attribute that may be undefined.

A function object only belongs to a partition object. In a single partition object, the function object ID value assigned to the function object is different from any of the collection object ID value and user object ID value.

Figure 3:
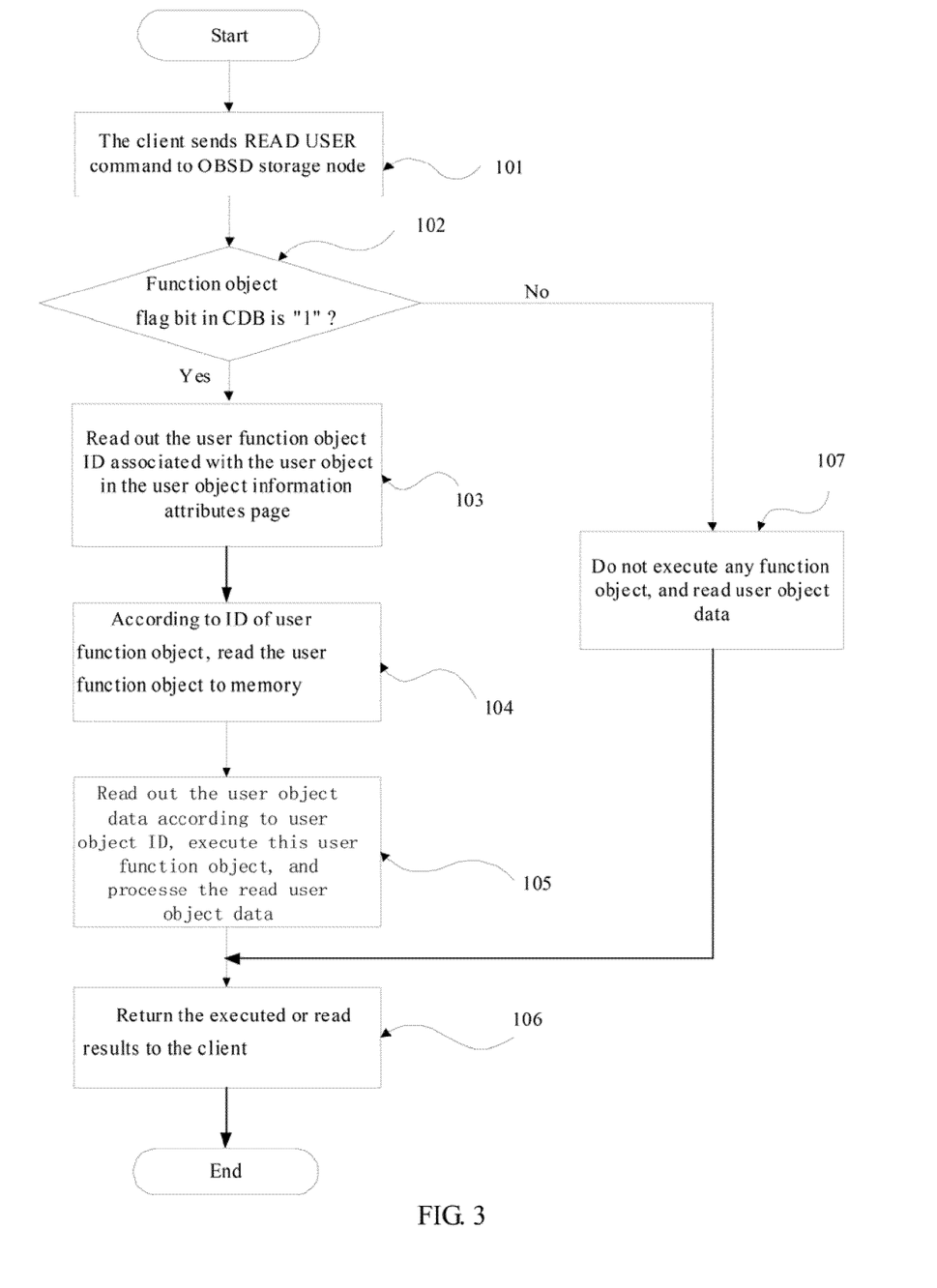
FIG. 3 illustrates the flow of the client sending READ command in the object-based storage system.
Figure 4:
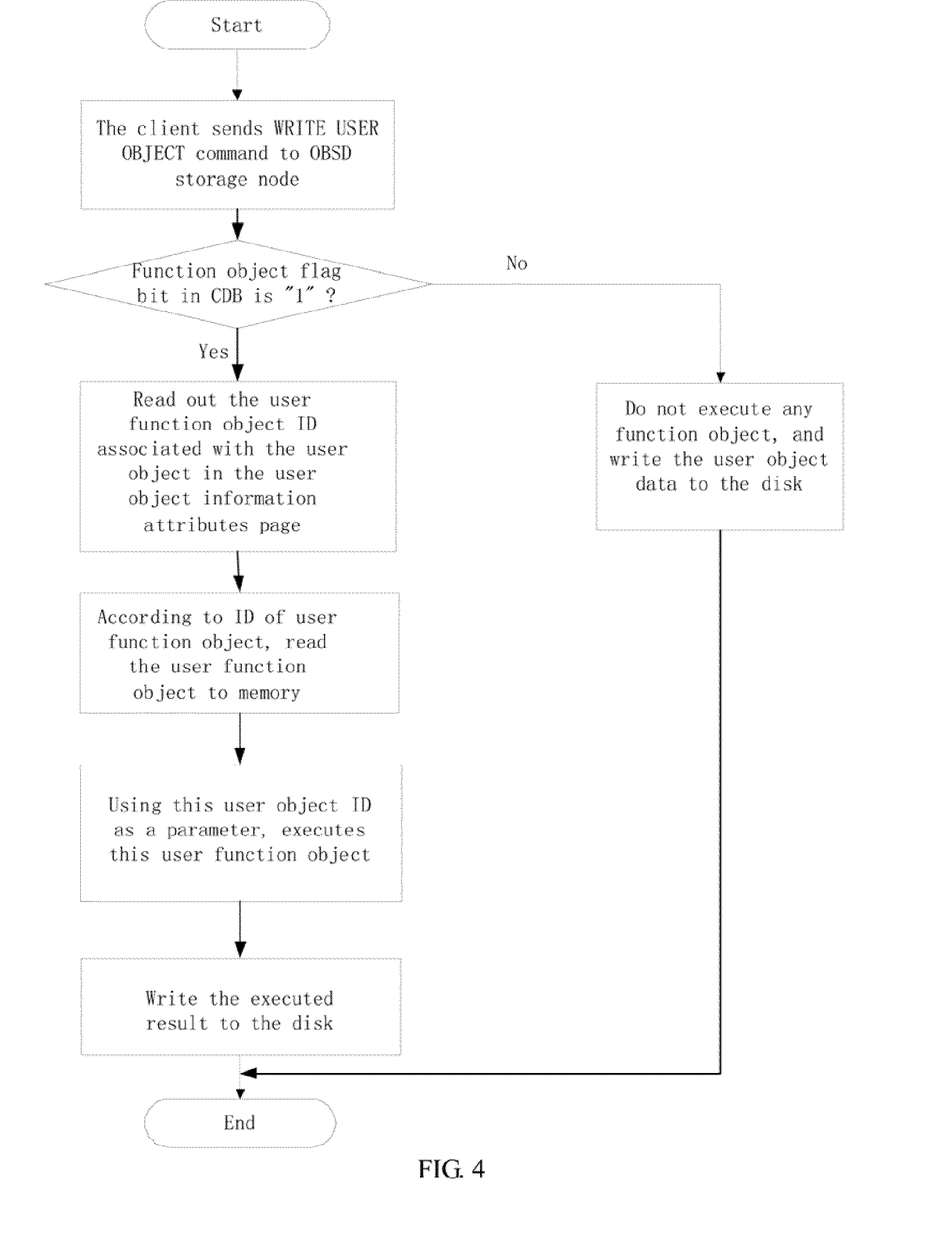
FIG. 4 illustrates the flow of the client sending WRITE command in the object-based storage system.

FIG. 3 illustrates the execution of a READ command send by the client in the object-based storage system. FIG. 4 illustrates the flow of a WRITE command send by the client in the object-based storage system. The Table 2 shows the CDB format of the READ/WRITE command.

TABLE 2

The CDB Format of READ/WRITE Command

| Byte | Bit | | | | | | | |
|---|---|---|---|---|---|---|---|---|
| | 7 | 6 | 5 | 4 | 3 | 2 | 1 | 0 |
| 8 | (MSB) | | | SERVICE ACTION | | | | |
| 9 | | | | | | | | (LSB) |
| 10 | Reserved | | FUN | DPO | FUA | | ISOLATION | |
| 11 | Reserved | | GET/SET CDBFMT | | | | Reserved | |
| 12 | | | | TIMESTAMPS CONTROL | | | | |
| 13 | (MSB) | | | Reserved | | | | |
| 15 | | | | | | | | (LSB) |
| 16 | (MSB) | | | PARTITION_ID | | | | |
| 23 | | | | | | | | (LSB) |
| 24 | (MSB) | | | USER_OBJECT_ID | | | | |
| 31 | | | | | | | | (LSB) |
| 32 | (MSB) | | | Length | | | | |
| 39 | | | | | | | | (LSB) |
| 40 | (MSB) | | | STARTING BYTE ADDRESS | | | | |
| 47 | | | | | | | | (LSB) |
| 48 | (MSB) | | | CDB CONTINUATION LENGTH | | | | |
| 51 | | | | | | | | (LSB) |
| 52 79 | | | | Get and set attributes parameters | | | | |
| 80 183 | | | | Capability | | | | |
| 184 235 | | | | Security parameters | | | | |

The value of FUN bit (the 5th bit of 10th byte as shown in Table 2) indicates whether it is required to call the corresponding function object during the process of reading or writing the user object. When the client sends READ/WRITE command to access the storage device, the storage device will check the value of FUN bit in the Command Description Block (CDB) defined in T10 OSD standard. If the value of FUN bit is "1," the system will call the user function object, which is associated with the user object that is being read/written, to execute the command. The user function object ID can be queried through the user object information attribute page identified by the user object ID (USER_OBJECT_ID). If the value of function object flag in the CDB is "0," the corresponding function objects will not be called to execute the command.

Upon starting the process shown in FIG. 3, at step 101, the client sends READ USER Object command to the OBSD storage node. At step 102, OBSD will determine whether the FUN bit (the function object flag in the CDB) is "1". If the flag is "1," step 103 will be executed, so that the user function object ID associated with user object in the user object information attribute will be read out. And at step 104, the user function object will be read into the memory according to the user function object ID; at step 105, the user object data will be read according to the user object ID, and then the user function object will be execute to process the user object data; at step 106, the executed or read results will be returned to the client. If OBSD determines that the function object flag in CDB is not "1," step 107 will be executed to read user object data without executing any function object.

As shown in FIG. 4, the client sends a WRITE command to the metadata server and it will access the storage device after receiving the metadata information from the metadata server. The storage device will check the FUN bit in the CDB. If the FUN bit is "1," the storage device will call the user function object that is associated with the user object being written. The user function object ID could be queried through the user object information attribute identified by the user object ID. The user object ID acts as a parameter for the execution of the function object. If the function object flag bit in the command is "0," none of function objects would be executed. Said operation process is similar to the procedure shown in FIG. 3. Those skilled in the art understand this operation process with reference to FIG. 4. For the purpose of brief description, unnecessary details will not be provided herein.

In addition to those commands (e.g., CREATE, WRITE, READ, SET_ATTR, GET_ATTR) defined in the T10 OSD standard that could operate the user object, the present invention also defines a number of commands related to the function object, as shown in Table 3.

TABLE 3

The commands related to the function object

| Command name | Description |
| --- | --- |
| CREATE AND WRITE FUNCTION | The client downloads the executable code to the storage device and creates a function object in the device. |
| LIST FUNCTION | The client requests the storage device to return the function object ID list in a specified partition or ID list of user objects user objects that are associated with the specified function object. |
| REMOVE FUNCTION | The client requests the storage device to delete a user function object or system function object. |

As shown in Table 3, CREATE AND WRITE FUNCTION command is used to download executable code to the storage device and create a function object in the storage device. REMOVE FUNCTION command is used to delete a function object when it is not necessary to use this function object. LIST FUNCTION command can list IDs of all the function objects in a partition object or all the user objects associated with the designated function object.

The execution of a CREATE AND WRITE FUNCTION command for object-based storage system includes following steps:

a-1. The function object length and the requested function object ID (REQUESTED FUNCTION_OBJECT_ID) in the CREATE AND WRITE FUNCTION command's CDB are set. Said function object length field defines the byte of the function object to be downloaded, and the requested function object ID defines the ID of function object to be created, as shown in Table 4.

TABLE 4

The CDB command format of CREATE AND WRITE FUNCTION command

| Byte | Bit 7 | 6 | 5 | 4 | 3 | 2 | 1 | 0 |
| --- | --- | --- | --- | --- | --- | --- | --- | --- |
| 8 | (MSB) | | SERVICE ACTION | | | | | |
| 9 | | | | | | | | (LSB) |
| 10 | Reserved | | | DPO | FUA | | ISOLATION | |
| 11 | Reserved | | GET/SET CDBFMT | | | Reserved | | |
| 12 | TIMESTAMPS CONTROL | | | | | | | |
| 13 | Reserved | | | | | | | |
| 15 | | | | | | | | |
| 16 (MSB) | | | PARTITION_ID | | | | | |
| 23 | | | | | | | | (LSB) |
| 24 (MSB) | | REQUESTED FUNCTION_OBJECT_ID | | | | | | |
| 31 | | | | | | | | (LSB) |
| 32 (MSB) | | | Function object length | | | | | |
| 39 | | | | | | | | (LSB) |
| 40 | | | Reserved | | | | | |
| 47 | | | | | | | | |
| 48 (MSB) | | | CDB CONTINUATION LENGTH | | | | | |
| 51 | | | | | | | | (LSB) |
| 52 | | | Get and set attributes parameters | | | | | |
| 79 | | | | | | | | |
| 80 | | | Capability | | | | | |
| 183 | | | | | | | | |
| 184 | | | Security parameters | | | | | |
| 235 | | | | | | | | | a-2. The client sends a CREATE USER/SYSTEM FUNCTION OBJECT command to the OBSD, and simultaneously downloads the content of the user/system function object. The content of the user/system function object to be created is encapsulated in the command data or parameter data segment in the data output buffer area.

a-3. OBSD reads the CDB sent from the client. If the value of the requested function object ID in this CDB is "0," OBSD will randomly assign a function object ID to the uploaded function object. If the value of the requested function object ID in this CDB is not "0," OBSD will attempt to assign the function object ID to the user/system function object to be created upon satisfying, at least, the following function object ID assignment conditions. That is, in a partition, the following circumstances are not permitted: a) at a moment, a function object ID identifies a plurality of function objects; or b) the function object ID is the same as a existing collection object ID or user object ID. If the field value of the requested function object ID is not "0," and OBSD is unable to assign the requested function object ID to the function object to be created, this function object will not be created, and this command will be terminated with a CHECK CONDITION status, with the detection code being set as ILLEGAL REQUEST and the additional detection code being set as INVALID FIELD IN CDB.

The execution of a LIST FUNCTION command for object-based storage system includes following steps:

b-1. The partition object ID (PARTITION_ID) field and function object ID (FUNCTION_OBJECT_ID) field in the LIST FUNCTION command's CDB are set. The content of function object ID field specifies the function object ID of the function object to be operated. The content of partition object ID field specifies the ID of the partition object to which the function object to be operated belongs, as shown in Table 5.

TABLE 5

The CDB command format of LIST FUNCTION command

| Byte | Bit 7 | 6 | 5 | 4 | 3 | 2 | 1 | 0 |
|---|---|---|---|---|---|---|---|---|
| 8 | (MSB) | | | SERVICE ACTION | | | | |
| 9 | | | | | | | | (LSB) |
| 10 | | Reserved | | Reserved | | | ISOLATION | |
| 11 | Reserved | LIST_ATTR | | GET/SET CDBFMT | | | Reserved | |
| 12 | | | | TIMESTAMPS CONTROL | | | | |
| 13 | | | | Reserved | | | | |
| 15 | | | | | | | | |
| 16 | (MSB) | | | PARTITION_ID | | | | |
| 23 | | | | | | | | (LSB) |
| 24 | (MSB) | | | FUNCTION_OBJECT_ID | | | | |
| 31 | | | | | | | | (LSB) |
| 32 | (MSB) | | | ALLOCATION LENGTH | | | | |
| 39 | | | | | | | | (LSB) |
| 40 | (MSB) | | | INITIAL OBJECT_ID | | | | |
| 47 | | | | | | | | (LSB) |
| 48 | (MSB) | | | LIST IDENTIFIER | | | | |
| 51 | | | | | | | | (LSB) |
| 52 | | | | Get and set attributes parameters | | | | |
| 79 | | | | | | | | |
| 80 | | | | Capability | | | | |
| 183 | | | | | | | | |
| 184 | | | | Security parameters | | | | |
| 235 | | | | | | | | | b-2. The client sends LIST FUNCTION command to OBSD.

b-3. OBSD reads the LIST FUNCTION command's CDB. If the field value of function object ID in the LIST FUNCTION command's CDB is "0," all the function object IDs in the partition object identified by the partition object ID in this CDB will be returned. If the value of the function object ID in the LIST FUNCTION command's CDB is not "0," the user object ID associated with the function object ID which is in the partition identified by the partition object ID in the LIST FUNCTION command's CDB will be returned. If the function object identified by this function object ID does not exist, this command will be terminated in CHECK CONDITION status, with the detection code being set as ILLEGAL REQUEST and the additional detection code being set as INVALID FIELD IN CDB.

The execution of a DELETE USER/SYSTEM: FUNCTION OBJECT command for object-based storage system includes following steps:

c-1. FFR (Force Function Removal) flag, function object ID field, and partition object ID field in the REMOVE USER/SYSTEM FUNCTION OBJECT command's CDB are set.

The content of function object ID specifies the function object to be deleted. The content of partition object ID specifies the partition object to which the function object to be deleted belongs, as shown in Table 6:

TABLE 6

The CDB command format of REMOVE FUNCTION command

| Byte | Bit 7 | 6 | 5 | 4 | 3 | 2 | 1 | 0 |
|---|---|---|---|---|---|---|---|---|
| 8 | (MSB) | | | SERVICE ACTION | | | | |
| 9 | | | | | | | | (LSB) |
| 10 | | Reserved | | DPO | FUA | | ISOLATION | |
| 11 | | Reserved | | GET/SET CDBFMT | | Reserved | | FFR |

TABLE 6-continued

The CDB command format of REMOVE FUNCTION command

| Byte | Bit 7 | 6 | 5 | 4 | 3 | 2 | 1 | 0 |
|---|---|---|---|---|---|---|---|---|
| 12 | | | | TIMESTAMPS CONTROL | | | | |
| 13 | | | | Reserved | | | | |
| 15 | | | | | | | | |
| 16 | (MSB) | | | PARTITION_ID | | | | |
| 23 | | | | | | | | (LSB) |
| 24 | (MSB) | | | FUNCTION_OBJECT_ID | | | | |
| 31 | | | | | | | | (LSB) |
| 32 | | | | Reserved | | | | |
| 47 | | | | | | | | |
| 48 | (MSB) | | | CDB CONTINUATION LENGTH | | | | |
| 51 | | | | | | | | (LSB) |
| 52 | | | | Get and set attributes parameters | | | | |
| 79 | | | | | | | | |
| 80 | | | | Capability | | | | |
| 183 | | | | | | | | |
| 184 | | | | Security parameters | | | | |
| 235 | | | | | | | | | c-2. The client sends REMOVE USER/SYSTEM FUNCTION OBJECT command to OBSD.

c-3. OBSD reads the CDB. If the value of partition object ID is "0," the function object identified by this function object ID in the partition identified by the partition object ID will be deleted.

c-4. If the field value of partition object ID is not "0," the function object is associated with some user object, and the flag of Force DELETE FUNCTION OBJECT is "0," this command will be terminated with an abnormal status.

c-5. If the field value of partition object ID is not "0," the function object is associated with some user object, and the value of Force Removal Function Object flag is "1," the function object ID attribute value is then set as "0" in the user object information attribute identified by the user object IDs that are associated with the function object identified by the function object ID. This indicates that these user objects are no longer associated with this function object. The function object identified by this function object ID in the partition that is identified by the partition object ID is then deleted.

c-6. If the value of partition object ID is not "0," and this function object is not associated with any user object, the function object identified by the function object ID in the partition that is identified by the partition object ID is then deleted.

In the programming of LIST command and REMOVE FUNCTION command, two processes are used to determine whether any function object ID is associated with the user object ID. The first process is to inquire user object information attribute to determine whether there is a function object ID attribute. The second process is to establish the association mapping table between the function object ID and user object ID, so that it is feasible to find the user object ID associated with the function object.

Figure 5:
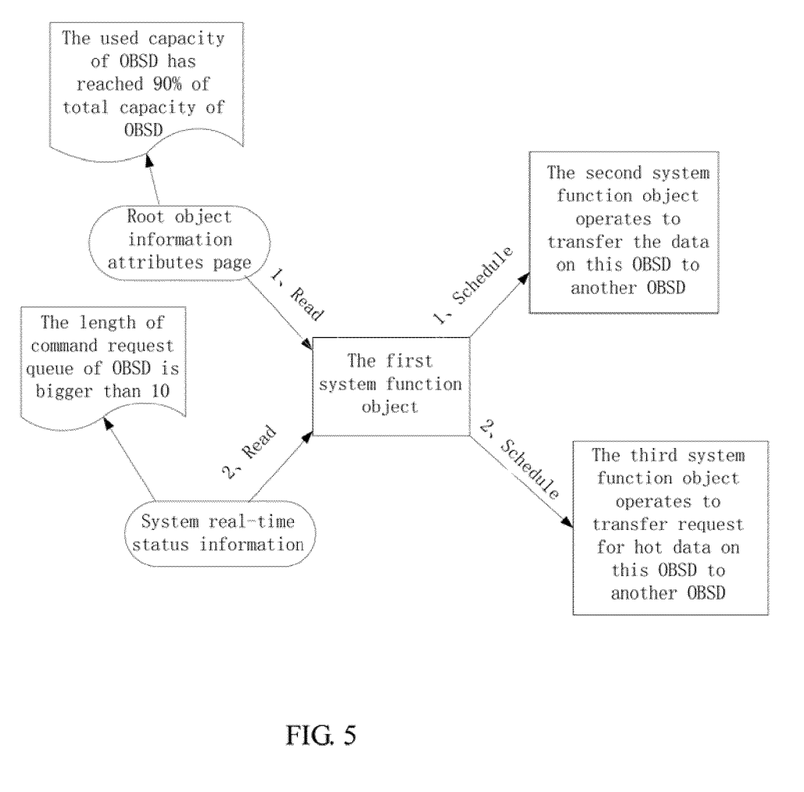
FIG. 5 illustrates the execution steps for realizing the self-management function of the system function object.

FIG. 5 illustrates the execution for realizing the self-management function of the system function object. As shown in FIG. 5, the first system function object operating in real-time in the zero partition object reads the root object's attribute and the system real-time status information of the object storage device; and determines the system status according to the read status information. If the system status meets the preset conditions of system, it will call other system function objects (the second . . . the nth system function objects) to perform specific system management functions. The Table 7 shows the various system function objects and their specific function.

TABLE 7

The list of system function objects

| The list of system function objects | Function |
| --- | --- |
| The first system function object | Read in real-time the root object attribute and the system real-time status information of the object-based storage device, and schedule other system function objects to execute. |
| The second system function object | Move the intensive data from this storage device to another storage device. |

TABLE 7-continued

The list of system function objects

| The list of system function objects | Function |
| --- | --- |
| The third system function object | Copy the hot data from this OBSD to another OBSD which is accessed at a lower frequency, and shift the request of hot spots data to the corresponding OBSD that has a lower access frequency. |
| ... | . |
| ... | . |
| ... | . |
| The $n^{th}$ system function object | Reserved |

The root object attribute in the object-based storage device OBSD records the usage of the whole system, including the root directory attribute page, the root information attribute page, the root quota attribute page, and the root error recovery attribute page. The Table 8 shows the contents of root information attribute page which records the information such as total capacity and the used capacity of the object storage system.

TABLE 8

The contents of root information attributes page

| Attribute number | Length (bytes)[a] | Attribute | Is the application client is settable? | Is it provided by OSD Logical Unit? |
| --- | --- | --- | --- | --- |
| 0h | 40 | Page identification | No | Yes |
| ... | . | . | . | . |
| ... | . | . | . | . |
| ... | . | . | . | . |
| 80h | 8 | Total capacity | No | Yes |
| 81h | 8 | Used capacity | No | Yes |
| 82h | | Reserved | | |
| 83h | 4 | Object accessibility | Yes | No |
| 84h to BFh | | Reserved | No | |
| C0h | 8 | Partition object number | No | Yes |
| ... | . | . | . | . |
| ... | . | . | . | . |
| ... | . | . | . | . |
| 0701 0000h to FFFF FFFEh | | Reserved | No | |

[a] A length of 0 in this column denotes an attribute that may be undefined.

The system real-time status information records the real-time operating condition of system, such as the CPU usage, memory usage and so on. Such real-time status information can be directly obtained from the system. For example, it is feasible to acquire the system information from /proc and /sysfs if Linux operation system is running on the storage device.

The system is required to preset the running conditions of these system function objects, so that the first system function object can program other system function objects to execute according to the system status information, as shown in Table 9:

TABLE 9

The list of preset running conditions

| Condition Number | Condition Description | The triggered system function objects (when condition is met) |
|---|---|---|
| 1 | The used capacity of OBSD reaches 90% of total capacity | The second system function object |
| 2 | The request queue length of OBSD is greater than 10 | The third system function object |
| ... | . | . |
| ... | . | . |
| ... | . | . |
| m | . | The nth system function object |

FIG. 5 illustrates two examples. In the first example, the first system function object acquires information from the root object attribute that 90% of the total capacity of OBSD has been used, which meets the preset condition No. 1. Thus the first system function object programs the second system function object, so as to move the data on this OBSD to another OBSD. In the second example, the first system function object acquires the real-time status information, and finds that the OBSD's command request queue length is bigger than 10, which meets the preset condition No. 2. Thus the first system function object programs the third system function object, so as to copy the hot data from this OBSD to another OBSD that is accessed at a lower frequency, and shift the request of hot spots data to the corresponding OBSD that has a lower access frequency.

Finally it must be mentioned that all embodiments in present invention are merely used to describe rather than limit the present invention. Although detail description of the present invention is provided with reference to preferred embodiments, the common technologists in this field shall understand that all the modifications or equitable substitutions to the present invention without deviation from the spirit of present invention shall be covered by the claims.

What is claimed is:

1. A management method for an object-based storage system comprising a client, an Object-Based Storage Device (OBSD), a metadata server and an interconnect network, wherein the interconnect network connects the client, the OBSD, and the metadata server; the OBSD comprises a root object, a partition object, a collection object, an user object, and a function object; and the function object comprises a user function object and a system function object;

comprising
the OBSD responding to a client request for the user object;
the OBSD calling the user function object to execute the client request;
the system function object reading the root object attributes and the real time system status information of the OBSD and determining whether the object-based storage system is in a specific condition;
wherein,
if the object-based storage system is in the specific condition, the system function object performing a predetermined specific system management functions; and
the user function object is associated with zero or a plurality of user objects, wherein the method of association comprises setting a function object ID (identifier) field in the user object attribute, wherein said function object ID stores a storage function object ID, and said function object ID identifies a specific function object;

executing a CREATE USER/SYSTEM FUNCTION OBJECT command, wherein the execution of said CREATE USER/SYSTEM FUNCTION OBJECT command comprises:
setting a function object byte length and a requested function object ID byte length in the CREATE USER/SYSTEM FUNCTION OBJECT command's CDB, wherein said requested function object's byte length defines a byte length of the function object's content to be downloaded;
the client sending the CREATE USER/SYSTEM FUNCTION OBJECT command to the OBSD, and simultaneously uploading a content of the user/system function object; wherein the content of the user/system function object to be created is encapsulated in a command data or a parameter data segment in a data output buffer area;
the OBSD reading the CDB, and
if the value of the requested function object ID is "0," the OBSD randomly assigning a function object ID to the uploaded function object; and
if the value of the requested function object ID is not "0," the OBSD assigning the function object ID to the user/system function object to be created upon meeting following function object ID assignment conditions, wherein in the partition, the following circumstances are not permitted: a) at a moment, a function object ID identifies a plurality of function objects; or b) the function object ID is the same as an existing collection object ID or a user object ID; and if the value of the requested function object ID is not "0" and the OBSD is unable to assign the requested function object ID to the function object to be created, the OBSD returning an error information to the client without creating a function object.

2. A management method for an object-based storage system comprising a client, an Object-Based Storage Device (OBSD), a metadata server and an interconnect network wherein the interconnect network connects the client, the OBSD, and the metadata server; the OBSD comprises a root object, a partition object, a collection object, an user object, and a function object; and the function object comprises a user function object and a system function object; comprising
the OBSD responding to a client request for the user object;
the OBSD calling the user function object to execute the client request;
the system function object reading the root object attributes and the real time system status information of the OBSD and determining whether the object-based storage system is in a specific condition;
wherein,
if the object-based storage system is in the specific condition, the system function object performing a predetermined specific system management functions; and
the user function object is associated with zero or a plurality of user objects, wherein the method of association comprises setting a function object ID (identifier) field in the user object attribute, wherein said function object ID stores a storage function object ID, and said function object ID identifies a specific function object;
executing a LIST FUNCTION command, wherein the execution of the LIST FUNCTION command comprises:

setting the partition object ID field and the function object ID field in the LIST FUNCTION command's COB;

the client sending the LIST FUNCTION command to the OBSD;

the OBSD reading the LIST FUNCTION command's CDB; and if the value of the function object ID in the LIST FUNCTION command's CDB is "0," returning the function object ID in the partition object identified by the partition object ID in this CDB;

if the value of the function object ID in the LIST FUNCTION command's CDB is not "0," returning the user object ID associated with the function object ID which is in the partition identified by the partition object ID in the LIST FUNCTION command's CDB; and if the function object identified by the function object ID does not exist, terminating the LIST FUNCTION command with an abnormal status.

3. A management method for an object-based storage system comprising a client, an Object-Based Storage Device (OBSD), a metadata server and an interconnect network, wherein the interconnect network connects the client, the OBSD, and the metadata server; the OBSD comprises a root object, a partition object, a collection object, an user object, and a function object; and the function object comprises a user function object and a system function object; comprising the OBSD responding to a client request for the user object;

the OBSD calling the user function object to execute the client request;

the system function object reading the root object attributes and the real time system status information of the OBSD and determining whether the object-based storage system is in a specific condition:

wherein, if the object-based storage system is in the specific condition, the system function object performing a predetermined specific system management functions; and the user function object is associated with zero or a plurality of user objects, wherein the method of association comprises setting a function object ID (identifier) field in the user object attribute, wherein said function object ID stores a storage function object ID, and said function object ID identifies a specific function object;

executing a REMOVE USER/SYSTEM FUNCTION OBJECT command, wherein the execution of the REMOVE USER/SYSTEM FUNCTION OBJECT command comprises:

setting a Force Remove Function Object flag, a function object ID and a partition object ID in the REMOVE USER/SYSTEM FUNCTION OBJECT command's CDB, wherein the function object, ID specifies the function object to be deleted, and the partition object ID specifies the partition object to which the function object to be deleted belongs;

the client sending the REMOVE USER/SYSTEM FUNCTION OBJECT command to the OBSD;

the OBSD reading the CDB, and if a value of the partition object ID is "0," deleting the function object identified by the function object ID in a partition identified by the partition object, ID;

if the value of the partition abject ID is not "0," the function object is associated with the user object, and the value of the Force REMOVE USER/SYSTEM FUNCTION OBJECT flag is "0," terminating the command with an abnormal status;

if the value of the partition object ID is not "0," the function object is associated with the user object, and the value of the Force Remove Function Object flag is "1," setting the function object ID attribute as "0," in the user object information attribute identified by the user object ID that are associated with the function object identified by the function object ID, so as to indicate that these user object is no longer associated with the function object, and deleting the function object identified by this function object ID in the partition identified by the partition object ID; and if the value of the partition object ID is not "0," and the function object is not associated with the user object, deleting the function object identified by the function object ID in the partition that is identified by the partition object ID.

* * * * *